United States Patent
Weiss et al.

(10) Patent No.: US 10,249,084 B2
(45) Date of Patent: Apr. 2, 2019

(54) TAP EVENT LOCATION WITH A SELECTION APPARATUS

(71) Applicant: Microsoft Technology Licensing, LLC, Redmond, WA (US)

(72) Inventors: John Weiss, Seattle, WA (US); Xiaoyan Hu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 15/178,587

(22) Filed: Jun. 10, 2016

(65) Prior Publication Data
US 2017/0358131 A1    Dec. 14, 2017

(51) Int. Cl.
| | | |
|---|---|---|
| *G06T 17/20* | (2006.01) | |
| *G06F 3/041* | (2006.01) | |
| *G06F 3/0484* | (2013.01) | |
| *G06T 19/00* | (2011.01) | |
| *G06F 3/00* | (2006.01) | |
| *G06F 3/01* | (2006.01) | |
| *G06F 3/0481* | (2013.01) | |

(Continued)

(52) U.S. Cl.
CPC .............. *G06T 17/20* (2013.01); *G06F 3/005* (2013.01); *G06F 3/011* (2013.01); *G06F 3/017* (2013.01); *G06F 3/0346* (2013.01); *G06F 3/03545* (2013.01); *G06F 3/0416* (2013.01); *G06F 3/04815* (2013.01); *G06F 3/04842* (2013.01); *G06T 19/006* (2013.01); *G06T 19/20* (2013.01); *G06T 2200/24* (2013.01); *G06T 2219/2021* (2013.01)

(58) Field of Classification Search
None
See application file for complete search history.

(56) References Cited

U.S. PATENT DOCUMENTS

| | | |
|---|---|---|
| 6,181,343 B1 | 1/2001 | Lyons |
| 6,552,722 B1 | 4/2003 | Shih et al. |

(Continued)

OTHER PUBLICATIONS

Khan, et al., "HoverCam: Interactive 3D Navigation for Proximal Object Inspection", In Proceedings of the symposium on Interactive 3D graphics and games, Apr. 3, 2015, pp. 73-80.

(Continued)

*Primary Examiner* — Yi Wang
(74) *Attorney, Agent, or Firm* — Ray Quinney & Nebeker, P.C.; Thomas M. Hardman; Miia Sula (57) ABSTRACT

A system and method for tap event location includes a device using a selection apparatus that provides accurate point locations. The device determines a 3-dimensional map of a scene in the view frustum of the device relative to a coordinate frame. The device receives an indication of the occurrence of a tap event comprising a contact of the selection apparatus with a subject, and determines the location of the tap event relative to the coordinate frame from the location of the selection apparatus. The location of the tap event may be used to determine a subject. Data associated with the subject may then be processed to provide effects in, or data about, the scene in the view frustum of the device. Embodiments include a selection apparatus that communicates occurrences of tap events to the device and includes features that allow the device to determine the location of the selection apparatus.

12 Claims, 5 Drawing Sheets

(51) Int. Cl.
*G06T 19/20* (2011.01)
*G06F 3/0346* (2013.01)
*G06F 3/0354* (2013.01)

(56) References Cited

U.S. PATENT DOCUMENTS

| | | | |
|---|---|---|---|
| 7,348,963 | B2 | 3/2008 | Bell |
| 8,797,274 | B2 | 8/2014 | Challener et al. |
| 9,152,226 | B2 | 10/2015 | Forutanpour et al. |
| 2010/0091112 | A1 | 4/2010 | Veeser et al. |
| 2010/0302247 | A1 | 12/2010 | Perez et al. |
| 2011/0164029 | A1* | 7/2011 | King .................. G06F 3/04883 345/419 |
| 2012/0050530 | A1 | 3/2012 | Raman et al. |
| 2012/0249741 | A1* | 10/2012 | Maciocci ................ G06F 3/011 348/46 |
| 2013/0044193 | A1 | 2/2013 | Kulkarni |
| 2014/0206443 | A1 | 7/2014 | Sharp et al. |
| 2014/0253692 | A1 | 9/2014 | Wilson et al. |

OTHER PUBLICATIONS

"International Search Report and Written Opinion Issued in PCT Application No. PCT/US2017/035575", dated Nov. 3, 2017, 18 Pages.

Yoon, et al., "TMotion: Embedeed 3D Mobile Input using Magnetic Sensing Technique", In Proceedings of the Text Encoding Initiative Tenth International Conference on Tangible, Embedded, and Embodied Interaction, Feb. 14, 2016, pp. 21-29.

* cited by examiner

TAP EVENT LOCATION WITH A SELECTION APPARATUS

BACKGROUND

It is frequently useful to construct a 3D computer model of a real world scene. This may be the case, for example, in an augmented reality (AR) device in which a composite image, with mixed real and non-real objects, is used to present a scene to a viewer using the AR device. In certain situations when constructing a 3D model of a real world scene, physical objects or surfaces may be modeled ambiguously or inaccurately and may not be identifiable or positioned correctly in the 3D model. Also, certain objects or surfaces may not be clearly distinguishable in the 3D model from other objects or surfaces that are nearby. In situations in which the 3D model includes these types of ambiguities or errors it may be desirable to configure a device, such as an AR device, to identify or locate points, objects or surfaces as accurately as possible in the real world scene despite possible ambiguities and inaccuracies in the 3D model.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Systems and methods for accurate tap event location within a scene in a device view frustum that is modeled by a 3-D map include embodiments that comprise a device for use with a selection apparatus. The device and the selection apparatus may be used to select a subject within a scene in the view frustum of the device, by tap event detection and location. Determination of the location of the selection apparatus during the tap event, as the selection apparatus contacts a target subject, allows an accurate determination of the subject that is selected. In various implementations of the system and method the determination of the subject may be used in further processing by applications on the device.

In an embodiment, the device determines a 3-dimensional (3-D) map of a scene in the view frustum of the device relative to a coordinate frame based on inputs from at least one sensor. The device receives an indication of the occurrence of a tap event from the selection apparatus, and determines the location of the tap event relative to the coordinate frame by determining the location of the selection apparatus relative to the device at the time of the tap event. The device then translates the location of the tap event into the 3-D map coordinate frame. The device may then determine the subject of the tap event based on the location of the tap event in the coordinate frame. The subject may comprise, for example, a point, a surface, an object, or a virtual object shown within the view frustum of the device. The selection apparatus may be configured to communicate occurrences of tap events to the device and include features that allow the device to determine the location of the tap event by determining the location of the selection apparatus. The determination of the location of the selection apparatus may include determination of the location of a particular point on, or portion of, the selection apparatus at which the tap event takes place.

The location of the tap event may be used to determine an accurate point location, an object, a surface, or a portion of a surface in the 3-D map. The use of the selection apparatus to perform a tap on or near art object or surface that triggers an indication of the tap event to the device, and, the ability of the device to locate the selection apparatus at the point of contact provides an accurate location of the tap event. Location data associated with the point location, the object, the surface, or the portion of a surface may then be processed further to provide effects in, or data about, the scene in the view frustum. For example, the location data may be used to implement application features in an augmented reality device that receives selections of objects, surfaces, or points in the device view frustum. The selected objects, surfaces, or points may then be manipulated in the augmented reality created by the device.

Example embodiments also include a selection apparatus including a tap event sensor that detects a tap event comprising a contact of the selection apparatus with an object or surface. The selection apparatus may include a module for communicating an indication of the occurrence of the tap event to another device remote to the object or surface. The selection apparatus may also include a fiducial marker to allow the other device to determine a location of the selection apparatus at the time of the tap event when the selection apparatus is located within a view frustum of the other device. In an implementation, the selection apparatus may be configured as a stylus including a tip, and the tap event sensor may be coupled to the tip of the stylus. The fiducial marker may be disposed at the tip of the stylus to allow the other device to determine an accurate location of the point of the tap event.

DETAILED DESCRIPTION

The system, method and apparatus will now be described by use of example embodiments. The example embodiments are presented in this disclosure for illustrative purposes, and not intended to be restrictive or limiting on the scope of the disclosure or the claims presented herein.

As used herein, a tap event occurs when a user taps a real world object with the tip of a selection apparatus (such as a stylus). A tap event may require that the stylus be placed in a tap-event mode or it may occur whenever the tip of the stylus detects that it has contacted a real world object (such as by using a pressure sensor on the tip of the stylus or by measuring the movement of the stylus using accelerometers to detect a sudden change). The stylus can then store the real world coordinates of the tap event (this is referred to as the tap even location) in memory.

The tap event location may provide advantages when used for subject selection in a real world scene within the view frustum of a device. In an implementation, a device may store a 3-D map that models the real world scene relative to a reference coordinate frame. The embodiments allow the user to obtain accurate location data through the device detecting and physically locating tap events, relative to the reference coordinate frame of the 3-D map. The tap events may be performed by tapping selected subjects such as points, objects or surfaces in the scene with a selection apparatus. The selection apparatus may be configured to provide an indication of the occurrence of the tap event to the device which allows the device to accurately determine the location at which the tap event occurred. The selection apparatus may be configured with features, such as a unique fiduciary marker, that enhance the ability of the device to accurately distinguish and locate the position of the selection apparatus within a 3-D scene that includes real world and simulated objects upon detecting that a tap event has occurred.

The location data of tap events in the coordinate frame may be used to accurately select subjects represented in the 3-D model for further processing or manipulation by device applications. Based on the location of the tap event, the device may determine, from a device use context defined by a device application, that an object or structure that includes a surface represented by the 3-D mesh was selected as the subject. The device may also determine from the device use context that only a portion of the surface represented by the 3-D mesh, and upon which the tap event occurred, was selected as the subject. The selected subject may also be a virtual object, such as an object projected into the scene by an augmented reality (AR) device.

Accurately locating the position of a tap event may provide advantages to a device that allows a user to perform input in a real world scene modeled by the device. For example, the positions of tap events may be used in an augmented reality (AR) device in which a composite image, with mixed real and non-real objects, is used to present a scene to a viewer. When used with an AR device, the tap event detection and location method of the embodiments allows more accurate selection of points, objects or surfaces as compared to selection methods that do not use the selection apparatus of the embodiments. The selection apparatus allows a user to provide a clear signal to an AR device that selection of a point, object or surface is intended by providing the AR device an accurate time and accurate location of the tap event. For example, a tap event may provide accurate differentiation between certain target objects or surfaces that are close to other objects or surfaces nearby in the real world. In one configuration, a user may desire to select a target object that is small compared to a background object on which it is placed. In this case, the user may tap the target object with the selection apparatus (this tap is the tap event) which then sends an indication of the tap occurrence to the AR device at the time of the tap event. The AR device may then locate the selection apparatus at the time of the tap event, determine the location of the tap event, and determine that the target object is to be selected. The AR device has a clear indication that selection of the object, i.e., target object, at the tap event location is intended.

In an example implementation using tap event location in a device and selection apparatus, the device may adjust and/or refine already stored coordinate location data defining a 3-dimensional mesh that models a physical surface in its 3-D map based on more accurate location data determined from tap events on the actual physical surface. This may be performed by determining the locations of tap events on the actual surface modeled by the 3-D mesh in the coordinate frame and comparing those tap event locations with location coordinates of the 3-D mesh in the 3-D model. The coordinate locations of the 3-D mesh stored in the 3-D model may then be adjusted to remove any inconsistencies between the tap event locations performed on the physical surface and the location coordinates of the 3-D mesh modeling the surface. This allows a user to fine tune the 3-D model of a real world scene as desired.

In further example implementations, location data of tap events may also be used to accurately perform measurements between points in a scene modeled by a 3-D map. The distance between two tap events performed at physical points in the scene may be used to determine and accurately measure the physical distance between the two points. For example, the 3-D map stored in a device may comprise location data associated with a first and a second 3-D mesh that represent, respectively, a first and a second surface in the device view frustum. The device may determine the occurrence of successive first and second tap events, performed on the first and second surfaces, respectively. The device may determine that the subject of the first tap event was the first surface based on the location of the first tap event relative to the first 3-D mesh location and determine that the subject of the second tap event was the second surface based on the location of the second tap event relative to the second 3-D mesh location. The device may then determine a distance between the first and second surface based on the 3-D map. For example, depending on the device use context, or a currently activated application, the device may determine the shortest or the longest distance between the first and second surfaces. Measurements made according to this implementation may be performed using any type of surfaces such as walls or curved surfaces. The device may also determine the shortest or longest distance between portions of the two surfaces. This implementation may be used, for example, when measuring between two walls since it doesn't require the first and second tap events to be directly opposite one another on the two walls for an accurate distance measurement.

Figure 1A:
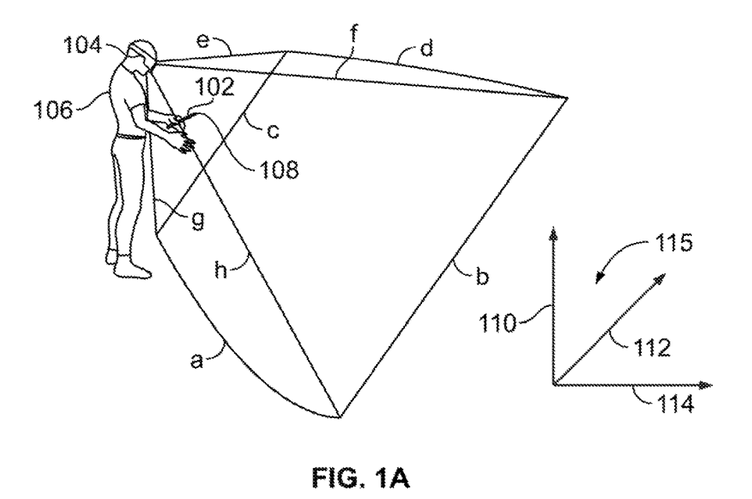
FIG. 1A illustrates an example implementation of a device using a selection apparatus.
Figure 1B:
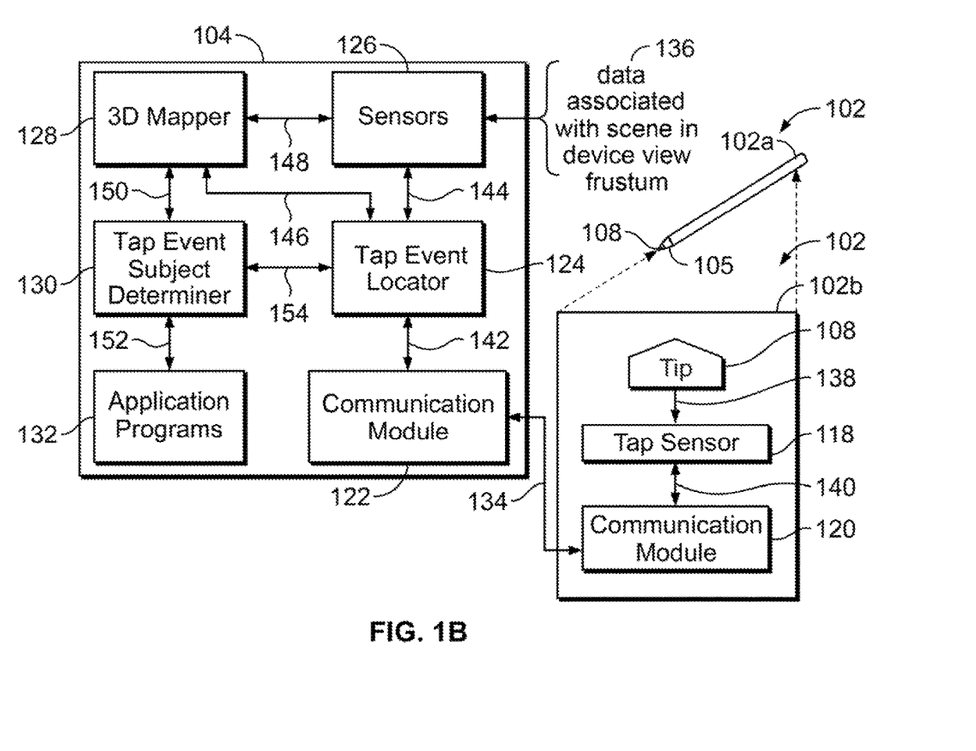
FIG. 1B illustrates a simplified block diagram illustrating portions of the device and selection apparatus of FIG. 1A.

Referring now to FIGS. 1A and 1B, therein is illustrated an example implementation of a device 104 and a selection apparatus 102. FIG. 1A illustrates an example scenario in which a user 106 is utilizing the device 104 in conjunction with the selection apparatus 102. In FIG. 1A, device 104 is implemented as a wearable headset device configured to provide augmented reality (AR) functions. Selection apparatus 102 may be implemented as a stylus type device that is configured to detect a tap event and generate an indication of the tap event for device 104. In an example implementation, selection apparatus 102 may include a tip 108 that is coupled to a tap sensor internal to selection apparatus 102.

Selection apparatus 102 may also include a fiducial marker that is disposed on a casing of selection apparatus 102 near tip 108. FIG. 1A illustrates an example view frustum provided to user 106 by device 104. The view frustum is defined by sight lines e, f, g and h that radiate out at angles from device 104 depending on the direction in which user 106 points device 104. The view frustum of device 104 may extend out along sight lines e, f, g and h as far out from device 104 as sensors on device 104 are able to detect objects in a scene. Lines a, b, c and d illustrate an example area of the view frustum at a particular distance from device 104. The view frustum extends to distances beyond the example area outlined by lines a, b, c and d. The view frustum provides a real world scene of objects to user 106. Device 104 determines and stores a 3-D map of the scene relative to a reference coordinate frame 115 represented by example axes 110, 112, and 114. Device 104 also determines its own location and orientation with respect to the reference coordinate frame. User 106 may hold selection apparatus 102 in their band and select objects or surfaces within the view frustum, i.e., the area outlined by lines a, b, c and d, of device 104 by tapping the objects with selection apparatus 102. In alternative implementations of FIG. 1A, device 104 may be configured as any type of mobile computing device, a smart phone, a tablet device, a static computing device, a system of components such as studio equipment, or any other device or system of components that interacts with a selection apparatus according to the embodiments.

FIG. 1B is a simplified block diagram illustrating portions of the device 104 and selection apparatus 102 of FIG. 1A. Device 104 includes communication module 122, tap event locator 124, sensors 126, 3-D mapper 128, tap event subject determiner 130, and application programs 132. Selection apparatus 102 may be configured as a stylus type device including casing 102a having a tip 108, and fiducial marker 105. Block 102b shows example components of device 102 which may be configured on and/or within casing 102a, including the tip 108, tap sensor 118 and communication module 120. Fiducial marker 105 may comprise a specially configured retroreflector or colored LED to allow a device, such as device 104, to visually distinguish the location of the tip of the stylus within the scene in the view frustum of device 104. Fiducial marker 105 may be disposed at or near the tip 108 of selection apparatus 102, where a tap occurs, to allow another device, such as device 104, to determine an accurate location of the tap event. Tap sensor 118 may be coupled to the tip 108 and be activated when a tap event occurs.

Figure 2A:
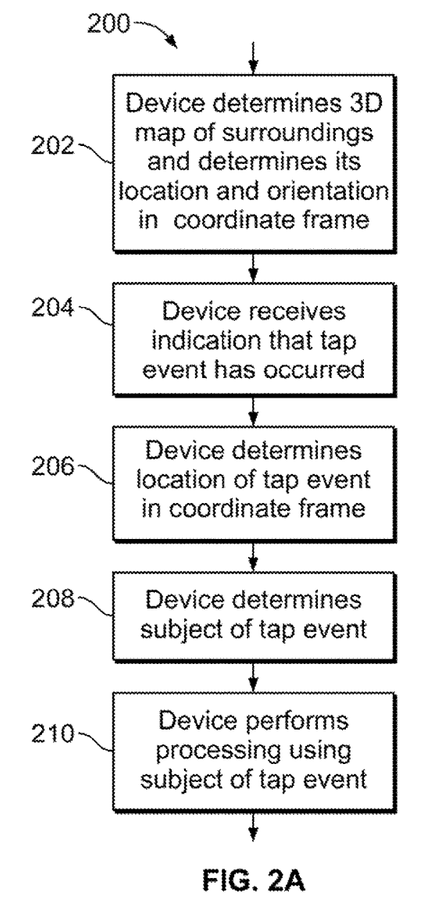
FIG. 2A is a flow diagram illustrating example operations performed by a device according to an embodiment of the disclosure.

Referring now to FIG. 2A, therein is a flow diagram illustrating example operations performed by a device according to an embodiment of the disclosure. The device of FIG. 2A may be implemented as device 104 of FIG. 1B and the operations of FIG. 2A may be described with reference to FIGS. 1A and 1B.

The process of FIG. 2A begins at 202 where device 104 determines a 3-D map of a real world scene within the view frustum of the device 104. The view frustum may comprise any scenes or surroundings within the range of sensors 126 and in the area outlined by view lines e, f, g and h as the view lines extend outward from device 104. The scene may be changing and be updated as user 106 changes the position of device 104.

The sensors 126 of device 104 may be used to sense and receive data associated with a scene within the view frustum 136 and provide the data 136 as sensed data 148 to 3-D mapper 128. The sensors 126 may comprise, for example, a depth camera, a red, green, blue (RGB) camera, and an inertial measurement unit (IMU). The 3-D mapper 128 may utilize the sensed data 148 to map the real world scene onto a 3-D map relative to the reference coordinate frame 115. 3-D mapper 128 may also determine the location and orientation of device 104 relative to the reference coordinate frame 115 by self-tracking device 104 as user 106 moves.

The 3-D map may comprise location data associated with objects and surfaces in the real world scene sensed by sensors 126 relative to the reference coordinate frame 115. The 3-D map may also comprise data associated with 3-D meshes that model one or more surfaces of the real world scene in example implementations, the 3-D map may also comprise data associated with virtual objects that are inserted into the real world scene or data associated with virtual manipulations of real world objects in the real world scene. For example, an AR device may augment the real world scene for a device user by inserting virtual objects into the scene, or changing characteristics of real world objects to appear different in the scene.

At 204, device 104 receives an indication from selection apparatus 102 that a tap event has occurred in the device view frustum. The indication may be received by device 104 at communication module 122 that is configured to receive wireless communications 134 from communication module 120 of selection apparatus 102. Communication module 122 may then provide an indication of a tap event 142 to tap event locator 124. In alternative implementations the indication that a tap event has occurred in the device view frustum may be received at device 104 by other methods that may be used to signal a tap event occurrence to device 104, such as optical, visual, acoustic or sound/audio signaling methods.

At 206, in response to receiving the indication of a tap event 142, tap event locator 124 determines the location of the tap event in the reference coordinate frame 115. Tap event locator 124 may determine the location of the tap event by utilizing data 144 provided by sensors 126 to locate selection apparatus 102 at the time of the tap event relative to the location of device 104. Tap event locator 124 may use the known location and orientation of device 104 in reference coordinate frame 115 provided by 3-D mapper/tracker 146 to translate the tap event's location relative to device 104 into the reference coordinate frame 115. The determination of the location of the device 104 by tap event locator 124 may occur immediately upon receiving the indication of the tap event 142 in order that the location of the tap event is accurately determined. In an implementation, tap event locator 124 and sensors 126 may be configured to detect fiducial marker 105 on selection apparatus 102 to determine the tap event location. Fiducial marker 105 may be disposed on selection apparatus 102 adjacent to the tip 108 which contacts the targeted object or surface during the tap event. In an alternative implementation to FIG. 1B, the selection apparatus 102 may be self-locating and signal its location to device 104 along with the indication that a tap event has occurred without device 104 needing to determine the location of the selection apparatus 102.

At 208, tap event subject determiner 130 determines the subject of the tap event based on the location of the tap event 154 provided by tap event locator 124 and data 150 provided by 3-D mapper 128. The subject selected by the tap event may depend on device use context and on a particular application program of application programs 132 that is processing the tap event location data.

In the embodiments, the tap event location determined by tap event locator 124 at 206 allows a particular application or program having a particular use context to more efficiently determine the subject of the tap event. For example, the subject selected by the tap event may be determined as a physical point, a surface or portion of a surface, an object or portion of an object, or a virtual object. In other implementations, depending on the application, multiple subjects, such as like appearing objects, may be selected based on one tap event that selects of the multiple subjects.

At 210, an application program 132 performs further processing in interaction with the other functions of device 104 using the determined subject of the tap event from operation 208. The processing may be any processing that uses, analyzes, or manipulates the selected subject in the view frustum scene modeled by the 3-D map in the device 104 to achieve an intended result.

Figure 2B:
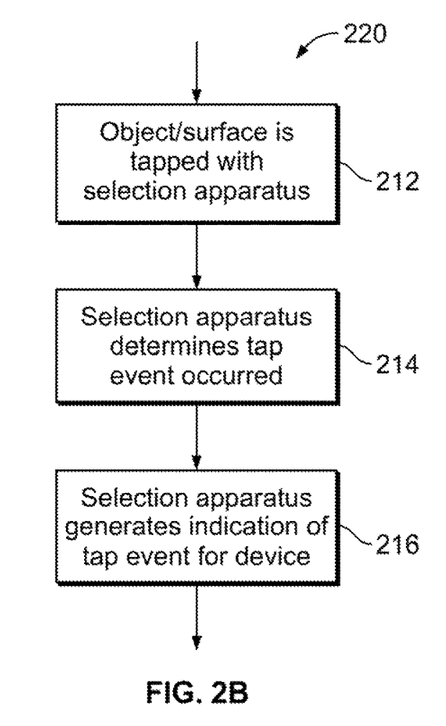
FIG. 2B is a flow diagram illustrating example operations performed by a selection apparatus according to an embodiment of the disclosure.

Referring now to FIG. 2B, therein is a flow diagram illustrating example operations performed by a selection apparatus according to an embodiment of the disclosure. The selection apparatus of FIG. 2B may be implemented as selection apparatus 102 of FIG. 1B and the operations of FIG. 2B may be described with reference to FIGS. 1A and 1B. Selection apparatus 102 may interact with device 104 as device 104 performs the operations of FIG. 2A. As illustrated in FIG. 2B, selection apparatus 102 may be configured as a stylus type device comprising case 102a including tip 108 to serve as the point of contact when an object or surface is tapped.

The process of FIG. 2B begins at 212 when an object or surface is tapped with tip 108 of selection apparatus 102. At 214, tap sensor 118 receives an indication 138 generated by the tap event at tip 108 and detects that the tap event has occurred. Tap sensor 118 may be implemented as a switch or pressure sensor that is activated by contact of tip 108 with the tapped object. Alternately, tap sensor 118 may be implemented as a microphone/acoustic sensor that senses the sound made by the tap of tip 108 on the selected object. In other alternative implementations, tap sensor 118 may include an accelerometer that is configured to sense contact of tip 108 with an object by sensing cessation of movement of selection apparatus 102 when selection apparatus 102 contacts the object. Also, an implementation of tap sensor 118 including an accelerometer may be used to sense tap selection of a virtual object. For example, the tap selection of a virtual object may be performed by sensing cessation of quick movement of selection apparatus 102 by a user at a point on a virtual object displayed to user 106 in the view frustum of device 104

At 216, in response to determining that a tap event has occurred, the selection apparatus 102 generates an indication of the tap event to device 104. Generation of the indication of the tap event to device 104 may include communication module 120 receiving an indication of a tap event 140 from tap sensor 108 and sending the indication as a wireless signal 134 from communication module 120 to communication module 122 of device 104. This may be the indication that a tap event has occurred that is received by device 102 at operation 204 of FIG. 2A. In an alternative implementation, tap sensor 118 may be implemented to include a sound generator that generates a unique audible click or sound signal that may be sensed directly by device 104. For example, the generation of the indication of the tap event may include generating a unique audible sound upon the occurrence of the tap event. The unique audible sound may be received by a microphone or sound sensor on device 104 to indicate a tap event has occurred.

Figure 3A:
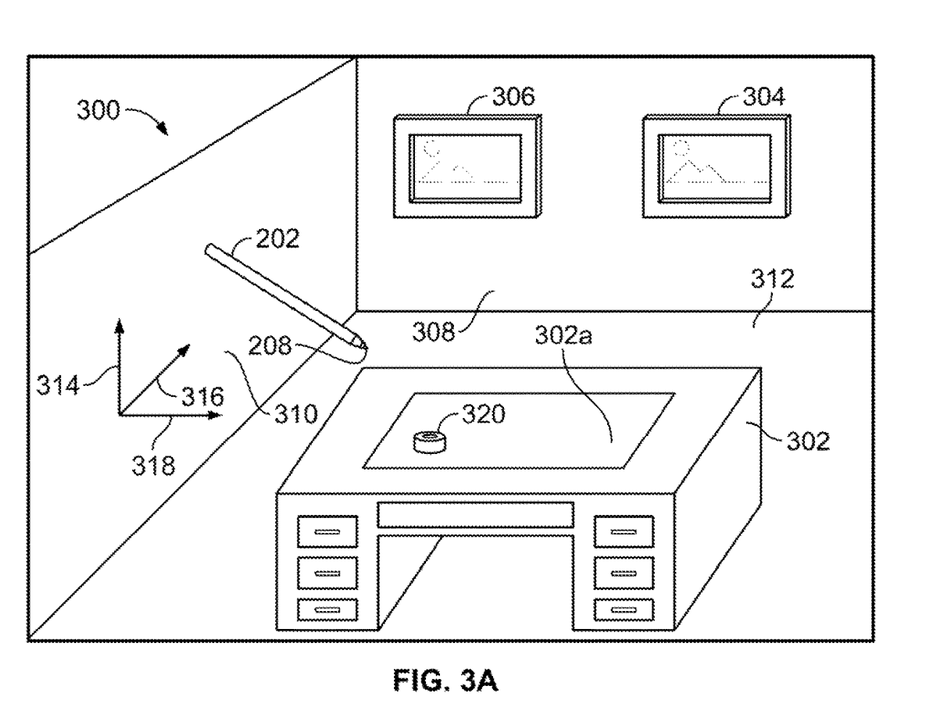
FIG. 3A illustrates an example use scenario of an implementation from within the view frustum of a device using a selection apparatus.

Referring now to FIG. 3A, therein is illustrated an example scene in the view frustum of a device implemented using a selection apparatus according to FIGS. 2A and 2B.

FIG. 3A illustrates a scene, for example, within the view frustum of device 104 of FIG. 1A. In the example implementation of FIG. 3A, device 104 determines 3-D map of scene 300 relative to a reference coordinate frame represented by the axis shown as lines 314, 316 and 318. The scene 300 includes a view of a room with a desk 302, floor 312, wall 308 and wall 310. Pictures 304 and 306 are shown on wall 308 and a desktop inlay 302a is shown on desk 302. Scene 300 may be a scene of an actual room or a scene of a reduced scale model of a room. For example, scene 300 may show a view of an architectural model. FIG. 3A also shows selection apparatus 102 of FIG. 1A comprising tip 108 which would be held in the hand of user 106 and manipulated as user 106 views the scene 300. In another scenario selection apparatus 102 may be held and manipulated by a person other than user 106. This may be useful when the view frustum of device 104 extends beyond the reach of user 106.

In an example scenario, user 106 may select points, surfaces or objects in scene 300 by tapping the tip 108 of selection apparatus 102 on a subject. For example, user 106 may select desk inlay 302a by tapping desk inlay 302a with tip 108. The processes of FIGS. 2A and 2B may then be used to accurately determine the location of the tap point on desk inlay 302a by determining the location of tip 108 in response to the tap. Application programs in device 104 may then determine that the subject of the tap event is desk inlay 302a. The implementation of providing an accurate tap location may have particular advantages, for example, when the tap is performed near the border between desk inlay 302a and desk 302. It may be difficult to determine which of desk inlay 302a or desk 302 is selected if other selection methods were used. In this case the availability of an accurate tap location may resolve ambiguities in determining which object is the selected subject. The desk inlay 302a may then be manipulated as desired by AR programs in device 104. For example, when it is determined that desk inlay 302a is the subject of the tap event, different colors may be overlaid and sampled on the desk inlay 302a. In another example, an object such as ashtray 320 may be selected by tapping it with tip 108. In a situation in which ashtray 320 is small and of a similar color as desk inlay 302a, an accurate location of a tap event on ashtray 320 may allow device 104 to determine that ashtray 320 has been selected. In certain situations, it may also provide data to device 104 that ashtray 320 exists in scene 300 and needs to be further processed for the 3-D map if device 104 did not initially recognize ashtray 320. In other example use scenarios, accurate tap event location determination may allow accurate object or surface selection related to other details of scene 300. For example, tap event location using stylus 102 and tip 108 may allow the selection of different portions of pictures 304 or 306 without ambiguity. In example scenarios, accurate tap event location may allow user 106 to accurately select a frame of picture 304 or 306 as opposed to the whole picture, or select an individual object depicted in the picture. Accurate tap event location of the embodiments may also be used to accurately select points in scene 300 so that virtual objects placed into scene 300 by device 104 may be precisely positioned. For example, user 106 may tap a point on wall 308 or 310 and device 104 may position a virtual object relative to the location of the tap event. In another example, a virtual object placed into scene 300 may comprise an object such as a virtual keyboard or control device having keys or selection buttons projected onto a surface such as desk inlay 302a. User 106 may use selection apparatus 102 to select a particular virtual key or selection button as a tap event subject according to the operations of FIGS. 2A and 2B by tapping the key or button's image on desk inlay 302a. In a further implementation, when an accelerometer is used in selection apparatus 102 as tap sensor 118, a virtual object may be selected as the tap event subject. For example, picture 306 may be a virtual picture inserted into scene 300 by device 104. Picture 306 may then be selected by virtually tapping picture 306 using rapid de-acceleration or cessation of movement of selection device 102 at the edge of picture 306. Selection device 102 may then determine from the de-acceleration or cessation of movement that a tap event which selected picture 306 has occurred.

In another example implementation, device 104 and selection apparatus 102 may be configured so that a tap event initiates a continuous contact with a surface. This implementation may be configured with pressure sensing at tip 108 using tap sensor 118 of selection apparatus 102 to monitor the continuous contact. An application in device 104 may be configured for determining and processing a continuous contact of the selection apparatus 102 with a surface. In example of this implementation, the application in device 104 that processes continuous contact of selection apparatus 102 with a surface may be activated by user 106 as desired. In this implementation, the location of the tap event is determined by determining the location of the tip 108 of selection apparatus 102 during an initial tap on a surface. Then the location of the tip 108 is continuously determined during the continuous contact of tip 108 with the surface. The determining and processing of a continuous contact may be used, for example, to trace accurate 2 dimensional (2-D) shapes to model surfaces in a view frustum. For example, in scenario 300 of FIG. 3A an accurate 2-D model of the surface of desk inlay 302a may be constructed by tapping the edge of inlay 302a, moving selection device 102 to trace around the edge of inlay 302a, and continuously determining and recording the location of tip 108 throughout the tracing. This would provide an accurate 2-D model of inlay 302a that would be especially useful if inlay 302a was not completely square, or desk 302 and inlay 302a were both warped or of irregular shape along the edges of inlay 302a. The 2-D model could then be used to build a replacement for inlay 302a that would accurately fit in the desk 302.

Figure 3B:
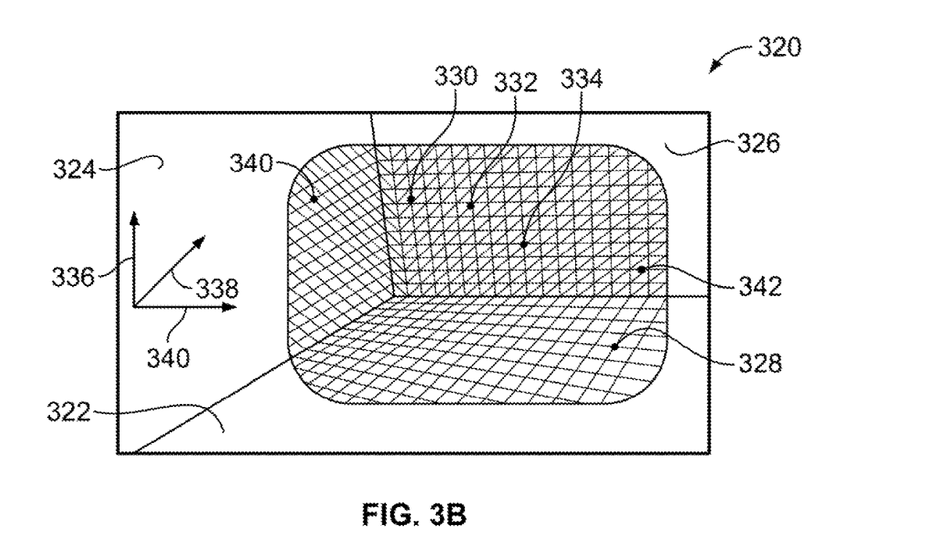
FIG. 3B illustrates an example use scenario of an implementation from within the view frustum of a device using a selection apparatus for surface location.

Referring now to FIG. 3B, therein is illustrated an example of use of an implementation from within the view frustum of a device using a selection apparatus fix surface location. FIG. 3B illustrates a scene 320 in a view frustum of a device. The view frustum may be, for example, a view frustum of device 104 of FIGS. 1A and 1B. In an example implementations using the tap event location of FIGS. 2A and 2B, device 104 determine 3-D map of scene 320 relative to a reference coordinate frame represented by the axis shown as lines 336, 338 and 340. Scene 320 illustrates a view of a corner of a room having floor 322, wall 324 and wall 326. The 3-D map of scene 320 has been created by device 104 to model suffixes on floor 322, wall 324 and wall 326, respectively, using 3-D meshes 328, 340 and 342. In the scenario shown in FIG. 3B accurate tap event location may be used to refine or confirm the 3-D mesh data that models a particular surface. For example, user 106 may perform tapping at points 330, 332 and 334 on the actual physical wall 326 using selection apparatus 102. For each tap, device 104 and selection apparatus 102 may determine the location of each tap event according to the process of FIGS. 2A and 2B. The location of the tap events on the actual physical wall at points 330, 332 and 334 in the 3-D map of scene 320 may then be compared with the location data associated with 3-D mesh 342. The location data associated with the 3-D mesh may then be modified or adjusted to be consistent with the location data obtained from the tap events to create a more accurate model of the surface of wall 326. If wall 326 is warped or curved a more accurate 3-D mesh model may be obtained. The implementation of FIG. 3B has use, for example, when a scene includes irregular surfaces with variations, and a device, such as device 104, is not able to accurately create a 3-D mesh to model the surface.

Figure 4A:
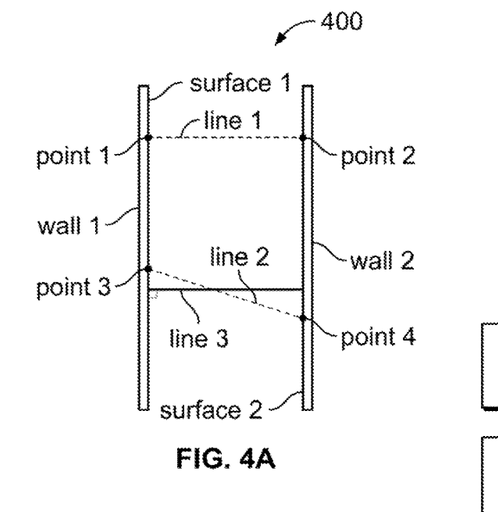
FIG. 4A illustrates points and surfaces in an example view frustum of a device for use in performing measurements.

Referring now to FIG. 4A, therein are illustrated points and surfaces in an example view frustum of a device for use in performing measurements according to an implementation. FIG. 4A illustrates a scene including wall 1 and wall 2. In the example, wall 1 and wall 2 may be walls or sides of a structure that are situated substantially parallel to each other. The view frustum may be, for example, a view frustum of device 104 of FIG. 2 modeling wall 1 and wall 2 in a 3-D map. The structure may be, for example, a room, a piece of furniture, or any other structure of different size.

Figure 4B:
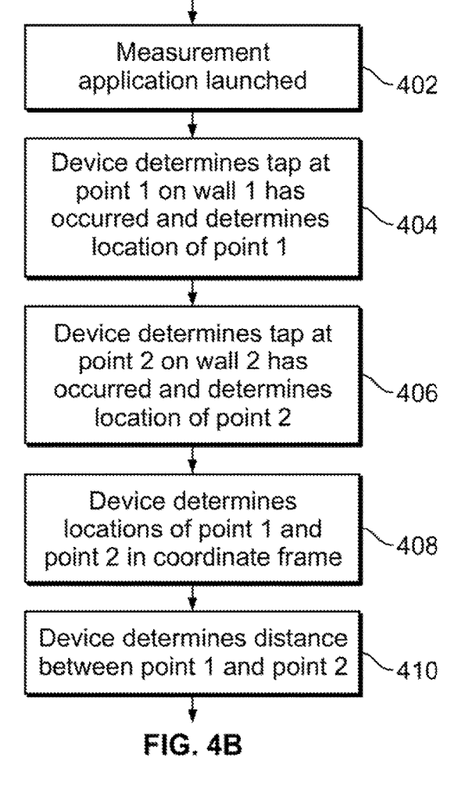
FIG. 4B is a flow diagram illustrating example operations performed when measuring between points of FIG. 4A according to an implementation.

Referring now to FIG. 4B, therein is a flow diagram illustrating example operations performed when measuring between points in FIG. 4A. FIG. 4B illustrates an example of how the distance between wall 1 and wall 2 may be measured using tap event detection and location according to FIGS. 2A and 2B. The process of FIG. 4B begins at 402 where a measurement application is activated on device 104. At 404, device 104 receives an indication that a tap event has occurred from selection apparatus 102 when a user of selection apparatus 102 taps at point 1 on surface 1 of wall 1. Device 104 then determines the location of point 1 by determining the location of fiducial marker 105 on selection apparatus 102 relative to device 104. At 406, device 104 receives an indication that a second tap event has occurred from selection apparatus 102 when a user of selection apparatus 102 taps at point 2 on surface 2 of wall 2. Device 104 then determines the location of point 2 by determining the location of fiducial marker 105 on selection apparatus 102 relative to device 104. At 408, device 104 uses the locations of point 1 and point 2 relative to device 104 to determine the locations of point 1 and point 2 relative to the coordinate frame of the 3-D map. Then at 410, device 104 determines the distance between point 1 and point 2 using the 3-D map to measure the distance between wall 1 and wall 2 at line 1.

Figure 4C:
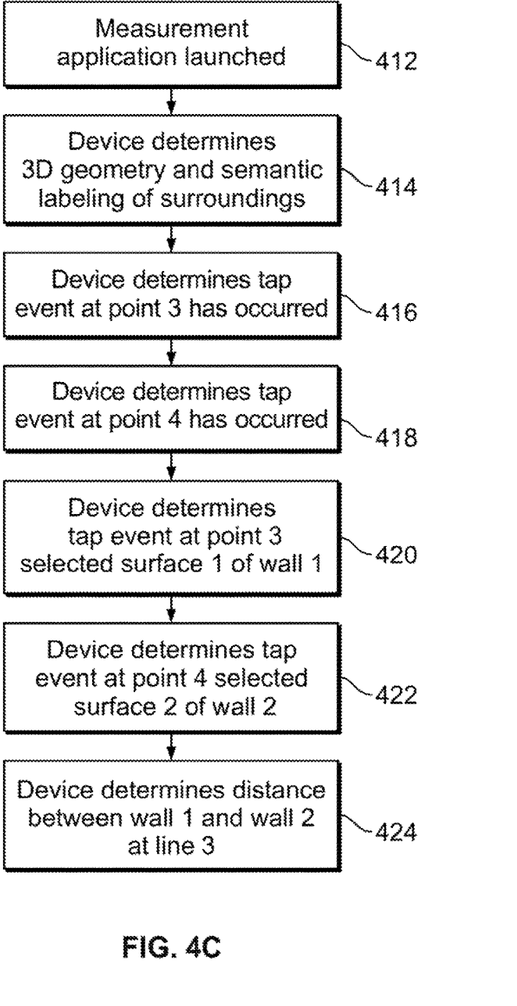
FIG. 4C is a flow diagram illustrating example operations performed when measuring between surfaces of FIG. 4A according to another implementation.

Referring now to FIG. 4C, therein is a flow diagram illustrating example operations performed when measuring between surfaces of FIG. 4A according to another implementation using the tap event location of FIGS. 2A and 2B. The process of FIG. 4C begins at 412 where a measurement application is activated on device 104. At 414, device 104 determines the 3-D geometry and a semantic labeling of objects in its view frustum to create a 3-D map. Depending on use context and the measurement application, the semantic labeling may be determined and applied by recognizing surfaces 1 and 2 as surfaces of wall 1 and wall 2, respectively. At 416, device 104 receives and indication that a tap event has occurred from selection apparatus 102 when a user of selection apparatus 102 taps at point 3 on surface 1 of wall 1. Device 104 then determines the location of point 3 by determining the location of fiducial marker 105 on selection apparatus 102 relative to device 104 upon the tap event at point 3. At 418, device 104 receives an indication that a second tap event has occurred from selection apparatus 102 when a user of selection apparatus 102 taps at point 4 on surface 2 of wall 2. Device 104 then determines the location of point 4 by determining the location of fiducial marker 105 on selection apparatus 102 relative to device 104. At 420, device 104 determines, from the semantic labeling, that the tap event at point 3 selected surface 1 of wall 1. At 422, device 104 determines, from the semantic labeling, that the tap event at point 4 selected surface 2 of wall 2. At 424, the measurement application program in device 104 then uses the 3-D map to measure the distance between surface 1 and surface 2 by determining the distance along line 3 which is perpendicular to each of selected surface 1 and 2. The measurement process of FIG. 4C may provide more accuracy than the measurement process of FIG. 4B. This will be the case when a user of selection apparatus 102 is not certain that the selected tap event points in FIG. 4A are directly across from one another or a user cannot reach points directly across from one another on the walls. For example, if the implementation of FIG. 4B was used with tap event points 3 and 4, the distance between surfaces 1 and 2 would be measured inaccurately as the distance shown by dotted line 2.

Figures 5A, 5B:
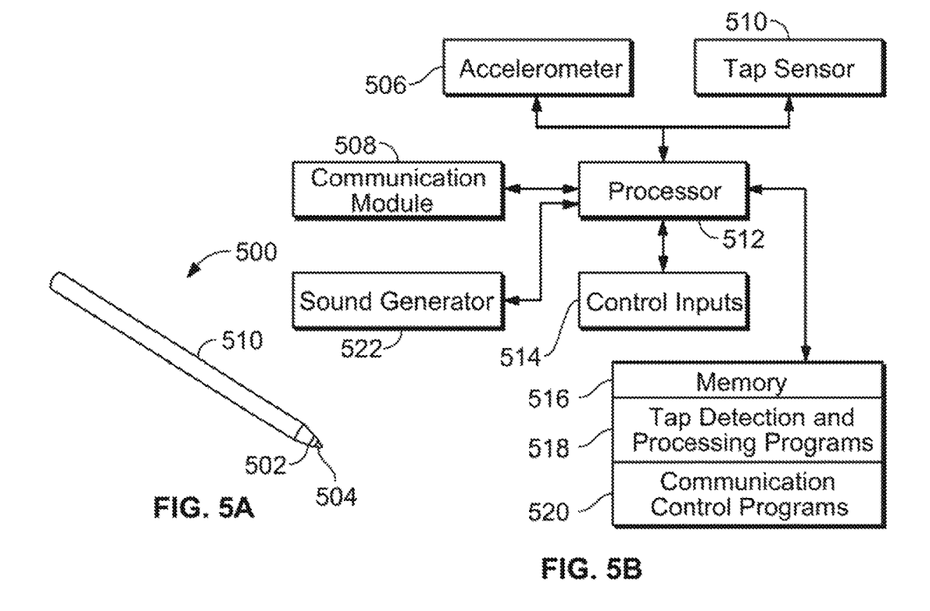
FIG. 5A is an illustration of an example selection apparatus.
FIG. 5B is a simplified block diagram illustrating portions of an example selection apparatus; and, FIG. 6 is a simplified block diagram illustrating portions of an example device.

Referring now to FIGS. 5A and 5B, therein is illustrated another example of a selection apparatus. FIG. 5A illustrates selection apparatus 500 as an example stylus shaped apparatus. The selection apparatus 500 may be one configuration of the selection apparatus 102 illustrated in FIG. 1. Selection apparatus 500 comprises a case portion 510 which may include circuitry/processors and mechanical structure configured to implement functions according to the embodiments. Case portion 510 comprises a tip 504 and fiducial marker 502 that is disposed on case portion 510 adjacent to tip 504. In an implementation, fiducial marker 502 may comprise a portion of tip 504 or be incorporated within tip 504. Fiducial marker 502 may comprise, for example, a retroreflective material or colored LED.

FIG. 5B is a simplified block diagram illustrating portions of example selection apparatus 500 of FIG. 5A. Selection apparatus 500 includes tap sensor 510, accelerometer 506, communication module 508, processor 512, sound generator 522, control inputs 514, and memory 516. Memory 516 includes tap detection and processing programs 518 and communication control programs 520. In implementations of selection apparatus 500, selection apparatus 500 may comprise more or less functions then those illustrated by the blocks of FIG. 5B. The configuration of functions in an implementation depends on the operations used for determining that a tap event has occurred and the operations used for generating an indication of the tap event to another device such as device 104 of FIG. 2.

Tap sensor 510 determines when a tap event occurs at tip 504. Tap sensor 510 may be, for example, a pressure sensing device or a switch at tip 504 that is activated by a tap event. Accelerometer 506 senses and generates movement data associated with selection apparatus 500 that may also be used by processor 512 in determining when tap events occur. In implementations of selection apparatus 500, tap sensor 510 and accelerometer 506 may be used in conjunction to sense tap events and provide data to be processed by processor 512 to determine when tap events occur. In alternative implementations, either of accelerometer 506 or tap sensor 510 may be implemented without the other in selection apparatus 500 to provide tap event data to be processed by processor 512 to determine when tap events occur.

Communication module 508 communicates an indication of a tap event to another device such as device 104 of FIG. 2. Communication module 508 also may be used to communicate any other control/setup information between selection apparatus 500 and another device such as device 104. Communication module 508 may be, for example, a short range wireless module configured to communicate signals using a protocol such as Bluetooth, Wi-Fi Direct, or any other wireless protocol that may be used to communicate with another device such as device 104. Sound generator 522 may be any type of device that generates a unique click or sound that is detectable at another device such as device 104. Sound generator 522 may be used to communicate an indication of a tap event to another device such as device 104 in alternative implementations of selection device 500.

Memory 516 may be implemented as any type of computer readable storage media in selection apparatus 500, including non-volatile and volatile memory. Processing unit 512 may comprise one or more processors, or other control circuitry or any combination of processors and control circuitry. In an implementation, when executed, tap detection and processing programs 518 and communications control programs 520 cause processor 512 to control selection apparatus 500 to implement tap event determination and generation of tap event indications to another device by performing the operations of FIG. 2B.

Selection apparatus 500 also may include control inputs 514 for setup/control of selection apparatus 500. Control inputs 514 may comprise one or more switches or buttons on selection apparatus 500 that allow a user to set a mode, for example, a mode for using communication module or a mode for using sound generator 522, to generate an indication of a tap event depending on the communication capabilities of other devices with which selection apparatus 500 communicates. Control inputs 514 may also be used to allow a user to set a mode for tap detection, for example, a mode that uses an accelerometer 506 or a tap sensor 510, or both, to determine a tap event has occurred. In an alternative implementation, for example, one or more of control inputs 514 may be incorporated into communication module 508 and control/setup of selection apparatus 500 may be performed wirelessly.

Figure 6:
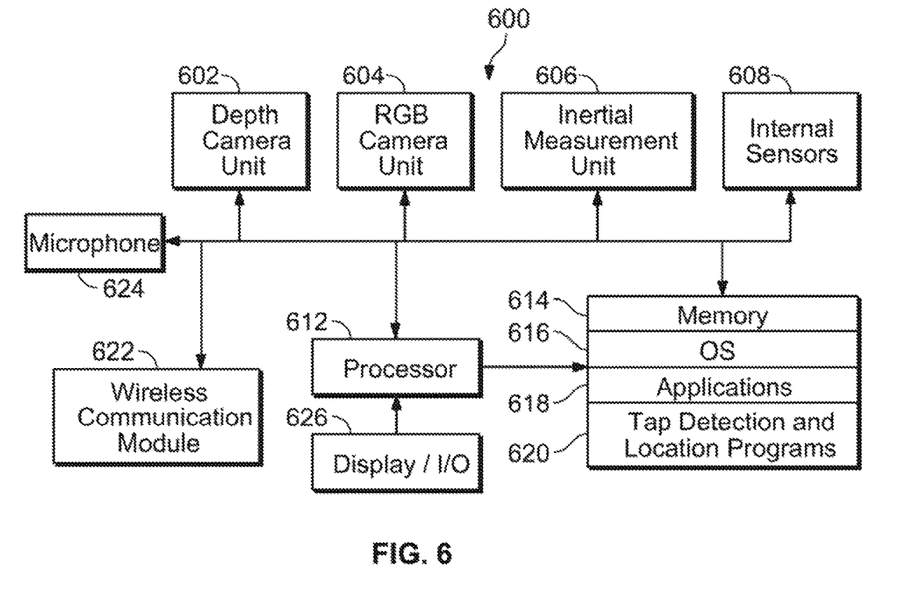

Referring now to FIG. 6, therein is a simplified block diagram illustrating portions of an example device implemented according to the disclosed embodiments. Device 600 represents a possible implementation of devices, such as device 104 of FIGS. 1A and 1B. Device 600 may include a display and input/output (I/O) 626 that provides an interface for a user. Display and I/O 626 may include, for example, a touch screen or keypad, a microphone, speakers, a visual display, a virtual display created in the view frustum of device 600, or other I/O functions which receive inputs and provide outputs to and from a user to allow the user to control device 600. Device 600 includes processor 612 and memory/storage 614 which is shown as including computer program code or instructions for tap detection and location programs 620, operating system code (OS) 616, and application programs 618. Device 600 also includes wireless communication module 622 that may be used to receive indications of occurrences of tap events from a selection apparatus such as selection apparatus 500. Wireless communication module 622 may also be used to exchange other control/setup information with the selection apparatus. A microphone 624 may be implemented with device 600 for use with a selection apparatus that indicates the occurrences of tap events by signaling with unique clicks or other sound generation techniques.

FIG. 6 also shows device 600 as including sensors comprising depth camera 602, RGB camera 604, inertial measurement unit (IMU) 606, and her internal sensors 608. Depth camera 602, RGB camera 504, inertial measurement unit (IMU) 606 and internal sensors 608 provide the data used for creating a 3-D map of a scene in the view frustum of device 600 relative to a reference coordinate frame and for self-tracking the location and orientation of device 600 in the reference coordinate frame. Memory 614 may be used to store data generated during self-tracking of the location of device 600 and the 3-D map data. Depth camera unit 602, RGB camera unit 604, inertial measurement unit (IMU) 606 and internal sensors 608 may also provide the data used to determine the location of a tap event, for example, by determining the location of fiducial marker 502 on selection apparatus 500, relative to device 600 upon receiving an indication of a tap event.

In an implementation, when executed, tap detection and location programs 620 cause processor 612 to control device 600 to implement tap detection and tap location by performing one or more operations of FIG. 2A. In particular implementations, application programs 618 may cause processor to control device 600 to implement operations such as operation 208 and 210 of FIG. 2A to process tap event occurrence and location data. In other example implementations, when executed, tap detection and location programs 620 and application programs 618 may also perform operations described in relation to FIGS. 3A-3B or FIGS. 4A-4C.

Memory 614 may be implemented as any type of computer readable storage media in device 600, including non-volatile and volatile memory. Processing unit 612 may comprise one or more processors, or other control circuitry or any combination of processors and control circuitry. Processing unit 612 provides overall control of device 600 and the other functional blocks shown in FIG. 6 by executing instructions or code in memory 614 to provide necessary functions for operation of device 600 according to the disclosed embodiments.

The functions shown in FIG. 6 may be implemented in a device such as device 104 of FIG. 2, a dedicated camera device or in a device, such as a laptop computer, a tablet computing device or smartphone that also has other capabilities in addition to the illustrated functions. Any device with the capability to determine receive the self-tracking and tap event location data and/or process the data may be used to implement the embodiments. Various implementations of devices, according to the embodiments may include more or less functions than those shown in FIG. 6.

For example, implementations of device 600 may include implementations as a smart phone, a tablet computer, camera, video camera, AR devices, a desktop computer, laptop computer device, gaming devices, media devices, smart televisions, home theater systems, smart automobile systems, smart house systems, multimedia cable/television boxes, smart phone accessory devices, tablet accessory devices, personal digital assistants (PDAs), portable media players, smart sensors, multimedia studio systems, or industrial control systems. Certain of the functional blocks shown in FIG. 6 may be omitted, added to, combined, or rearranged in these other implementations.

The example embodiments disclosed herein may be described in the general context of processor-executable code Of instructions stored on memory that may comprise one or more computer readable storage media (e.g., tangible non-transitory computer-readable storage media such as memory 516 or 614). As should be readily understood, the terms "computer-readable storage media" or "non-transitory computer-readable media" include the media for storing of data, code and program instructions, such as memory 516 or 614, and do not include portions of the media for storing transitory propagated or modulated data communication signals.

The disclosed embodiments include a device comprising one or more processors and memory in communication with the one or more processors, the memory comprising code that, when executed, causes the one or more processors to receive data associated with a scene in the view frustum of the device from at least one sensor, determine a 3-dimensional map of the scene in the view frustum relative to a coordinate frame based the data, receive an indication from a selection apparatus that a tap event has occurred within the scene in the view frustum of the device, locate, in response to the tap event occurring, at least a portion of the selection apparatus in the view frustum relative to the device using the at least one sensor, determine a location of the tap event relative to the coordinate frame based on the location of the at least a portion of the selection apparatus, and, determine a subject of the tap event based on the location of the tap. The subject may comprise a real object within the scene in the view frustum of the device or the subject may comprise a virtual object within the scene in the view frustum of the device.

The 3-dimensional map may comprise location data associated with a 3-dimensional mesh that represents at least a portion of a surface, and the device may determine the subject by determining the at least a portion of the at least one surface based on the location of the tap event and the location data associated with the 3-dimensional mesh. The code, when executed, may further cause the one or more processors to adjust the location data associated with the 3-dimensional mesh based on the location of the tap event on the surface. The tap event may comprise a first tap event, the subject may comprise a first point, the indication received from the selection apparatus may comprise a first indication received from the selection apparatus, and the code, when executed, may further cause the one or more processors to determine that a second tap event has occurred based on a second indication received from the selection apparatus, locating, in response to the second tap event occurring, at least a portion of the selection apparatus in the view frustum relative to the device using the at least one sensor, determine a location of the second tap event relative to the coordinate frame based on the location of the at least a portion of the selection apparatus located in response to the second tap event occurring, determine a second point based on the location of the second tap event, and, determine a distance between the first and second point.

Embodiments are also disclosed in which the subject comprises a first subject, the 3-dimensional map comprises location data associated with a first and a second 3-dimensional mesh that represent, respectively, the first and a second subject in the scene in the view frustum device, the tap event comprises a first tap event, the indication received from the selection apparatus comprise a first indication received from the selection apparatus, and the code, when executed, causes the one or more processors to determine the first subject from the first 3-dimensional mesh based on the location of the first tap event, determine that a second tap event has occurred based on a second indication received from the selection apparatus, locate, in response to the second tap event occurring, at least a portion of the selection apparatus in the view frustum relative to the device using the at least one sensor, determine a location of the second tap event relative to the coordinate frame based on the location of the at least a portion of the selection apparatus located in response to the second tap event occurring, determine the second subject from the second 3-dimensional mesh based on the location of the second tap event, and, determine a distance between the first and second subject based on the 3-dimensional map.

The tap event may initiate a continuous contact with the subject and the code, when executed, may cause the one or more processors to determine the location of the selection apparatus relative to the coordinate frame during the continuous contact. Further embodiments of a device are also disclosed in which the indication received from the selection apparatus comprises data from an accelerometer in the selection apparatus, the indication received from the selection apparatus data comprises data from a pressure sensor in the selection apparatus, or the indication received from the selection apparatus data comprises sound generated by the selection apparatus. The device may determine the location of the tap event by determining a location of a fiducial marker on the selection apparatus.

Disclosed embodiments also include a method comprising receiving data associated with a scene in the view frustum of a device from at least one sensor, determining a 3-dimensional map of the scene in the view frustum of the device relative to a coordinate frame based on the data, receiving an indication from a selection apparatus that a tap event has occurred within the scene in the view frustum of the device, locating, in response to the tap event occurring, at least a portion of the selection apparatus in the view frustum relative to the device using the at least one sensor, determining a location of the tap event relative to the coordinate frame based on the location of the at least a portion of the selection apparatus, and, determining a subject of the tap event based on the location of the tap event. The subject may comprise a real object in the scene in the view frustum of the device or the subject may comprise a virtual object in a scene in the view frustum of the device. The 3-dimensional map may comprise location data associated with a 3-dimensional mesh that represents at least a portion of a surface, and the determining the subject of the tap event may comprise determining the at least a portion of the surface based on the location of the tap event and the location data associated with the 3-dimensional mesh. The method may further comprise adjusting the location data associated with the 3-dimensional mesh based on the location of the tap event on the at least a portion of a surface.

Embodiments of the method are also disclosed in which the tap event comprises a first tap event, the subject comprises a first point, the indication received from the selection apparatus comprise a first indication received from the selection apparatus, and the method further comprises receiving a second indication from the selection apparatus that a second tap event has occurred in the scene in the view frustum of the device, locating, in response to the second tap event occurring, at least a portion of the selection apparatus in the view frustum relative to the device using the at least one sensor, determining a location of the second tap event relative to the coordinate frame based on the location of the at least a portion of the selection apparatus located in response to the second tap event occurring, determining a second point based on the location of the second tap event, and, determining a distance between the first and second points. Embodiments of the method also those in which the subject comprises a first subject, the 3-dimensional map comprises location data associated with a first and a second 3-dimensional mesh that represent, respectively, the first and a second subject in the scene in the view frustum of the device, the tap event comprises a first tap event, the indication received from the selection apparatus comprise a first indication received from the selection apparatus, and the method further comprises determining the first subject from the first 3-dimensional mesh based on the location of the first tap event, receiving an second indication from the selection apparatus that a second tap event has occurred in the scene in the view frustum of the device, locating, in response to the second tap event occurring, at least a portion of the selection apparatus in the view frustum relative to the device using the at least one sensor, determining a location of the second tap event relative to the coordinate frame based on the location of the at least a portion of the selection apparatus located in response to the second tap event occurring, determining the second surface from the second 3-dimensional mesh based on the location of the second tap event, and, determining a distance between the first and second subject based on the 3-dimensional map.

The disclosed embodiments also include an apparatus comprising a fiducial marker to visually indicate a location of the apparatus to a computing device when the location is within a view frustum of the computing device, a tap event sensor for detecting tap event comprising a contact of the apparatus with a subject remote to the computing device, and, a module for communicating an indication of the occurrence of the tap event to the computing device. The tap event sensor may comprise an accelerometer. The apparatus may comprise a stylus having a casing including a tip, the fiducial maker may be disposed at the tip, the tap event sensor may be included within the casing and coupled to the tip of the stylus, and the module may be included within the casing.

While implementations have been disclosed and described as having functions implemented on particular devices, one or more of the described functions for the devices may be moved between the devices and implemented on a different one of the devices than shown in the figures, or on different types of equipment.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is meant to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained by one skilled in the art and it is intended that the present disclosure encompass all such changes, substitutions, variations, alterations, and modifications as filling within the scope of the appended claims.

What is claimed is:

1. A device comprising:
   at least one sensor;
   one or more processors in communication with the at least one sensor; and
   memory in communication with the one or more processors, the memory comprising code that, when executed, causes the one or more processors to control the device to:
      receive and update data associated with a scene in a view frustum of the device using the at least one sensor as position of the device changes, the data including sensor data related to an object in the scene;
      determine from the sensor data a three-dimensional map of the scene in the view frustum relative to a coordinate frame, wherein the three-dimensional map comprises location data associated with a three-dimensional mesh that models at least a portion of a surface of the object in the scene;
      display the scene in the view frustum on a display and update the scene as the position of the device changes, wherein the scene includes the object and the three-dimensional mesh modeling at least the portion of the surface of the object;
      receive a wireless communication from a selection apparatus that the selection apparatus has detected a tap event within the scene in the view frustum;
      locate, in response to the tap event occurring, at least a portion of the selection apparatus in the view frustum relative to the device using the at least one sensor;
      determine a location of the tap event relative to the coordinate frame based on the location of at least the portion of the selection apparatus; and
      determine that at least the portion of the surface is a subject of the tap event based on the location of the tap event and the location data associated with the three-dimensional mesh.

2. The device of claim 1, wherein the subject comprises a real object in the scene in the view frustum.

3. The device of claim 1, wherein the subject comprises a virtual object in the scene in the view frustum.

4. The device of claim 1, wherein the code, when executed, further causes the one or more processors to adjust the location data associated with the three-dimensional mesh based on the location of the tap event on the at least a portion of the surface.

5. The device of claim 1, wherein the tap event comprises a first tap event, the subject comprises a first point, the wireless communication received from the selection apparatus comprises a first wireless communication received from the selection apparatus, and the code, when executed, further causes the one or more processors to control the device to:
      receive a second wireless communication from the selection apparatus that a second tap event has occurred within the scene in the view frustum;
      locate, in response to the second tap event occurring, at least the portion of the selection apparatus in the view frustum relative to the device using the at least one sensor;
      determine a location of the second tap event relative to the coordinate frame based on the location of at least the portion of the selection apparatus located in response to the second tap event occurring;
      determine a second point based on the location of the second tap event; and
      determine a distance between the first point and the second point.

6. The device of claim 1, wherein the subject comprises a first subject, wherein the location data is associated with a first three-dimensional mesh and a second three-dimensional mesh that represent, respectively, the first subject and a second subject in the scene in the view frustum of the device, wherein the tap event comprises a first tap event, wherein the indication received from the selection apparatus comprises a first indication received from the selection apparatus, and wherein the code, when executed, causes the one or more processors to control the device to:
      determine the first subject from the first three-dimensional mesh based on the location of the first tap event;
      receive a second indication from the selection apparatus that a second tap event has occurred within the scene in the view frustum;
      locate, in response to the second tap event occurring, at least the portion of the selection apparatus in the view frustum relative to the device using the at least one sensor;
      determine a location of the second tap event relative to the coordinate frame based on the location of at least the portion of the selection apparatus located in response to the second tap event occurring;
      determine the second subject from the second three-dimensional mesh based on the location of the second tap event; and
      determine a distance between the first subject and the second subject based on the three-dimensional map.

7. The device of claim 1, wherein the tap event initiates a continuous contact with the subject and wherein the code, when executed, causes the one or more processors to control the device to determine the location of the selection apparatus relative to the coordinate frame during the continuous contact.

8. The device of claim 1, wherein the device locates at least the portion of the selection apparatus by locating a fiducial marker on the selection apparatus.

9. A method comprising:
      receiving and updating data associated with a scene in a view frustum of a device using at least one sensor as position of the device changes, the data including sensor data related to an object in the scene;
      determining from the sensor data a three-dimensional map of the scene in the view frustum relative to a coordinate frame, wherein the three-dimensional map comprises location data associated with a three-dimensional mesh that models at least a portion of a surface of the object in the scene;
      displaying the scene in the view frustum on a display as the position of the device changes, wherein the scene includes the object and the three-dimensional mesh modeling at least the portion of the surface of the object;

receiving a wireless communication from a selection apparatus that the selection apparatus has detected a tap event within the scene in the view frustum;

locating, in response to the tap event occurring, the at least a portion of the selection apparatus in the view frustum relative to the device using the at least one sensor;

determining a location of the tap event relative to the coordinate frame based on the location of at least the portion of the selection apparatus; and determining that at least the portion of the surface is a subject of the tap event based on the location of the tap event and the location data associated with the three-dimensional mesh.

10. The method of claim 9, wherein the method further comprises adjusting the location data associated with the three-dimensional mesh based on the location of the tap event on at least the portion of the surface.

11. The method of claim 9, wherein the tap event comprises a first tap event, the subject comprises a first point, the wireless communication received from the selection apparatus comprises a first wireless communication received from the selection apparatus, and the method further comprises:

receiving a second wireless communication from the selection apparatus that a second tap event has occurred within the scene in the view frustum;

locating, in response to the second tap event occurring, at least the portion of the selection apparatus in the view frustum relative to the device using the at least one sensor;

determining a location of the second tap event relative to the coordinate frame based on the location of at least the portion of the selection apparatus located in response to the second tap event occurring;

determining a second point based on the location of the second tap event; and determining a distance between the first point and the second point.

12. The method of claim 9, wherein the subject comprises a first subject, wherein the location data is associated with a first three-dimensional mesh and a second three-dimensional mesh that represent, respectively, the first subject and a second subject in the scene in the view frustum of the device, wherein the tap event comprises a first tap event, wherein the indication received from the selection apparatus comprises a first indication received from the selection apparatus, and wherein the method further comprises:

determining the first subject from the first three-dimensional mesh based on the location of the first tap event;

receiving a second indication from the selection apparatus that a second tap event has occurred within the scene in the view frustum;

locating, in response to the second tap event occurring, the at least a portion of the selection apparatus in the view frustum relative to the device using the at least one sensor;

determining a location of the second tap event relative to the coordinate frame based on the location of at least the portion of the selection apparatus located in response to the second tap event occurring;

determining the second subject from the second three-dimensional mesh based on the location of the second tap event; and determining a distance between the first subject and the second subject based on the three-dimensional map.

* * * * *